(12) United States Patent
Stoeger et al.

(10) Patent No.: US 9,151,487 B2
(45) Date of Patent: Oct. 6, 2015

(54) HEATING ELEMENT, STEAM CUTTING DEVICE, AND BURNER OF A POWER-GENERATING DEVICE

(75) Inventors: Max Stoeger, Vorchdorf (AT); Christian Magerl, Langschlag (AT); Josef Leeb, Pettenbach (AT); Christian Resch, Ruhstorf (DE); Daniel Platzer, Wels (AT)

(73) Assignee: Fronius International GmbH, Pettenbach (AT)

(*) Notice: Subject to any disclaimer, the term of this patent is extended or adjusted under 35 U.S.C. 154(b) by 281 days.

(21) Appl. No.: 13/990,254

(22) PCT Filed: Dec. 22, 2011

(86) PCT No.: PCT/AT2011/000509
§ 371 (c)(1),
(2), (4) Date: May 29, 2013

(87) PCT Pub. No.: WO2012/088552
PCT Pub. Date: Jul. 5, 2012

(65) Prior Publication Data
US 2013/0248497 A1 Sep. 26, 2013

(30) Foreign Application Priority Data
Dec. 29, 2010 (AT) .................................. A 2157/2010

(51) Int. Cl.
*B23K 10/00* (2006.01)
*F22B 1/28* (2006.01)
(Continued)

(52) U.S. Cl.
CPC .................. *F22B 1/281* (2013.01); *B23K 9/013* (2013.01); *B23K 10/00* (2013.01); *F23D 11/448* (2013.01); *F23D 14/42* (2013.01); *F23D 14/66* (2013.01); *H05B 6/108* (2013.01); *H05H 1/34* (2013.01)

(58) Field of Classification Search
CPC ........ F22B 1/281; B23K 9/013; B23K 10/00; F23D 11/448; F23D 14/42; F23D 14/66; H05B 6/108; H05H 1/34; H05H 1/42; H05H 1/48

USPC ........... 219/121.3, 6, 121.52, 121.48, 121.59, 219/430; 392/386, 389, 388
See application file for complete search history.

(56) References Cited

U.S. PATENT DOCUMENTS

| 5,528,020 A | 6/1996 | Dickens et al. |
| 6,326,581 B1 | 12/2001 | Laimer et al. |

(Continued)

FOREIGN PATENT DOCUMENTS

| AT | 502 448 B1 | 6/2007 |
| CN | 1836467 A | 9/2006 |

(Continued)

OTHER PUBLICATIONS

Chinese Office Action dated Jan. 27, 2015 in Chinese Application No. 201180061079.3 with English translation.
(Continued)

*Primary Examiner* — Mark Paschall
(74) *Attorney, Agent, or Firm* — Collard & Roe, P.C.

(57) ABSTRACT

The invention relates to a heating element (25) for liquids to be vaporized as well as a burner (6) of a steam cutting device (1) and a burner (38) of a power-generating device, the element being designed as an induction heater (47) comprising one coil (25a). In order to improve vaporization, the coil (25a) of the induction heater (47) is enclosed in a hybrid construction which is composed of a main part (31) with laterally extending webs (33), and which consists of an easily magnetizable material (35) and a thermally highly-conductive material, a covering element (32) consisting of nanocrystalline materials being arranged on the webs (33), and the easily magnetizable material (35) being designed to be installed on a thermally highly-conductive material (37) of a vaporizer (21).

11 Claims, 7 Drawing Sheets

(51) Int. Cl.
*B23K 9/013* (2006.01)
*F23D 11/44* (2006.01)
*F23D 14/42* (2006.01)
*F23D 14/66* (2006.01)
*H05B 6/10* (2006.01)
*H05H 1/34* (2006.01)

(56) References Cited

U.S. PATENT DOCUMENTS

| | | | |
|---|---|---|---|
| 6,909,839 B2 * | 6/2005 | Wang et al. | 392/389 |
| 6,967,315 B2 * | 11/2005 | Centanni et al. | 219/628 |
| 7,034,263 B2 | 4/2006 | Kagan | |
| 7,180,264 B2 | 2/2007 | Smith et al. | |
| 7,965,925 B2 | 6/2011 | Eder et al. | |
| 8,212,172 B2 | 7/2012 | Haberler et al. | |
| 2006/0219709 A1 | 10/2006 | Kagan | |
| 2008/0011741 A1 * | 1/2008 | Hamaguchi et al. | 219/642 |
| 2009/0230096 A1 | 9/2009 | Haberler et al. | |
| 2010/0243620 A1 | 9/2010 | Yamawaku et al. | |
| 2011/0104587 A1 * | 5/2011 | Poshusta et al. | 429/513 |
| 2011/0234158 A1 | 9/2011 | Artelsmair et al. | |

FOREIGN PATENT DOCUMENTS

| | | |
|---|---|---|
| CN | 101253017 A | 8/2008 |
| CN | 101258785 A | 9/2008 |
| CN | 101847560 A | 9/2010 |
| EP | 1 050 200 B1 | 10/2002 |
| JP | 2000-039786 A | 2/2000 |
| JP | 2001-188428 A | 7/2001 |
| JP | 2001-230064 A | 8/2001 |
| WO | WO 93/08668 A1 | 4/1993 |
| WO | WO 2010/078606 A2 | 7/2010 |

OTHER PUBLICATIONS

International Search Report of PCT/AT2011/000509, mailed May 16, 2012.
Austrian Office Action dated May 9, 2011 in Austrian Application No. A 2157/2010 with English translation of the relevant parts.

* cited by examiner

HEATING ELEMENT, STEAM CUTTING DEVICE, AND BURNER OF A POWER-GENERATING DEVICE

CROSS REFERENCE TO RELATED APPLICATIONS

This application is the National Stage of PCT/AT2011/000509 filed on Dec. 22, 2011, which claims priority under 35 U.S.C. §119 of Austrian Application No. A 2157/2010 filed on Dec. 29, 2010, the disclosures of which are incorporated by reference. The international application under PCT article 21(2) was not published in English.

The invention relates to a heating element for liquids to be vaporised, for example, for a burner of a steam cutting device or a burner of a power-generating device, said element being designed as an induction heater comprising a coil.

Furthermore, the invention relates to a steam cutting device comprising such a heating element and a burner of a power-generating device of a charging device comprising such a heating element.

From EP 1 050 200 B1 there is known a steam cutting device which is composed of a burner, a control device, a liquid supply system and a power source. The burner is connected to the power source via lines and to the liquid supply system via a supply line. At least one channel or flow channel having a given cross-section, in which the liquid is converted into a gaseous state, is arranged in the burner. Furthermore, the burner comprises at least a cathode and an anode, the liquid supply being connected via a line to an intermediate space between the cathode and the anode. A heating element is contained in the burner, whereby a length of the channel or flow channel or a surface thereof is dimensioned such that, in the case of a pre-determinable heat supply by the heating element, a thermal energy required for the complete vaporisation of the supplied liquid can be supplied, whereby the heating element is formed by a resistance heating element, heating cartridges or a radiant heater.

The disadvantage in using a resistance heating element is that the energy density is limited by an ohmic heating, since there exists a large amount of heat transition resistances. For one thing, there exists a heat transition resistance between the heating element or heating resistance and insulating material. In addition, there exists a heat transition resistance due to the thermal conduction in the insulating material and one between the insulating material and the vaporiser, which varies greatly depending on the type of assembly and the contact pressure. At full load, due to the total amount of these resistances, the operating temperature of the heating element or the heating resistance is mostly several 100 Kelvin above that of the vaporiser. The temperatures occurring there may destroy the heating resistance. This might only be remedied by a reduction of the energy density and thus an increase in the heating surface.

AT 502 448 B1 discloses a construction of a steam plasma burner.

A power-generating device for portable chargers is known e.g. from U.S. Pat. No. 7,180,264 B2. The charging current for the batteries is generated by the power-generating device, whereby the power-generating device comprises a fuel tank, a burner, a thermal element and a control device. Due to its physical properties the thermal element generates an electric voltage or electrical energy, if it is connected to a consumer and thus an electric current is flowing. A precondition for the occurrence of the thermoelectric voltage is a certain temperature difference between the two sides of the thermal element. For this purpose, one side of the thermal element is heated with the help of the burner, which burns the fuel from the tank, whereas the other side of the thermal element has an ambient temperature, thus guaranteeing the temperature difference necessary for the thermoelectric voltage. In particular lithium ion and lithium polymer batteries having a maximum capacity of 0.5 ampere hours (Ah) can be charged by this method. Compared with this, a battery or an energy storage having a higher capacity, e.g. of 30 Ah and more, as is the case with an energy storage of a vehicle, in particular motor vehicle, cannot be charged gently and effectively. In addition, with the burner used, a so-called worm burner, no stable burning is possible either, so that the constant temperature difference necessary for the effective power generation cannot be achieved.

Furthermore, from WO 2010/078606 A2 there is known a charger for charging an energy storage comprising a power generating device, a charger and other components. The power generating device is formed by a heat source comprising at least a burner that is connected to a supply line for a fuel, and a thermal element, a burner, a heating device and a nozzle for such a charger. For providing a constantly stable combustion and enabling a vaporisation process to be maintained by itself, the power generating device, the charger and the other components are arranged in a joint housing. In the lowermost area of the housing, a vaporiser for the supplied fuel is arranged. A rear housing wall is adapted as an element for dissipating heat.

Inductively acting heating elements of the generic type can be gathered from JP 2001230064 A, JP 2001188428 A and JP 2000039786 A.

The object of the present invention consists in the provision of an above cited heating element as well as a steam cutting device and a burner of a power generating device, by means of which an improved vaporisation of the supplied liquid can be achieved.

The object of the invention is solved by an above cited heating element, whereby the coil of the induction heating is enclosed in a hybrid construction consisting of a base part having laterally extending webs and having an easily magnetisable material and a thermally highly conductive material, a covering element of nanocrystalline materials being arranged on the webs and the easily magnetisable material being arranged in engagement with a thermally highly conductive material of a vaporiser.

The object of the invention is also solved by an above-cited steam cutting device and a burner of a power generating device of a charger having such a heating element.

By using an induction heating, the heat transition resistance may be limited or reduced, since the energy is generated directly in the metal and thus only the heat conduction in the metal is decisive. Thus, far lower temperature gradients are generated and far higher power densities can be achieved in thermal transfer. Replacing a known resistance heating element by a known induction heater, however, would not yield a satisfactory reactive power to apparent power ratio and would require a large amount of power electronics, in order to achieve the desired active power. This is improved in that the magnetic circuit was optimised with the help of magnetic materials withstanding temperatures>200° C., in particular magnetic materials of nanocrystalline structures and optimised geometries. Thus, the reactive power decreases and the required operating frequency is reduced significantly.

The hybrid construction of the induction heater is composed of a main part with laterally extending webs, inside of which the coil is arranged and finally a covering element is arranged. This creates a simple construction and at the same time provides a good positioning of the coil for the assembly.

Due to the use of the hybrid construction of the vaporiser consisting of an easily magnetisable material and a thermally highly conductive material, the advantages of the low penetration depth of the eddy current in materials having a high permeability and thus a high energy input at comparably low frequencies can be combined with the good heat conductivity.

Also advantageous is a construction in which the easily magnetisable material is made of iron or ferritic high-grade steel, and the highly thermally conductive material is made of copper, aluminium or silver. Thereby, optimum absorption of the magnetic flux in the material and thus a faster and more reliable vaporisation of a passing liquid supplied are achieved. Thus, the vaporisation channel of the vaporiser can also be shortened, as a result of which the size of the burner of a steam cutting device or a power-generating device can be considerably reduced in size. The handling of the steam cutting device will be improved substantially thereby.

If the easily magnetisable material of the hybrid construction is pressed onto the thermally highly conductive material of the vaporiser, a reliable and firm seat can be achieved and, at the same time, the transition resistance can be kept as low as possible, and thus the heat losses can be reduced. Thus, the efficiency can be improved.

The easily magnetisable material encompasses the coil from all sides, i.e. from all four sides in an advantageous manner, thus achieving an even better guidance of the magnetic flux.

It also constitutes an advantage, however, if a circuit driven in the current mode is provided for triggering the induction heater, since thus a reliable regulation of the heating can be achieved.

The circuit advantageously comprises transistors, whereby always two transistors are being switched on until a certain current value has been reached by the heating. Thus, sufficient energy will be supplied to the heating, and thus an optimum heat output will be obtained.

The present invention will be explained with reference to the attached drawings, in which.

Figure 1:
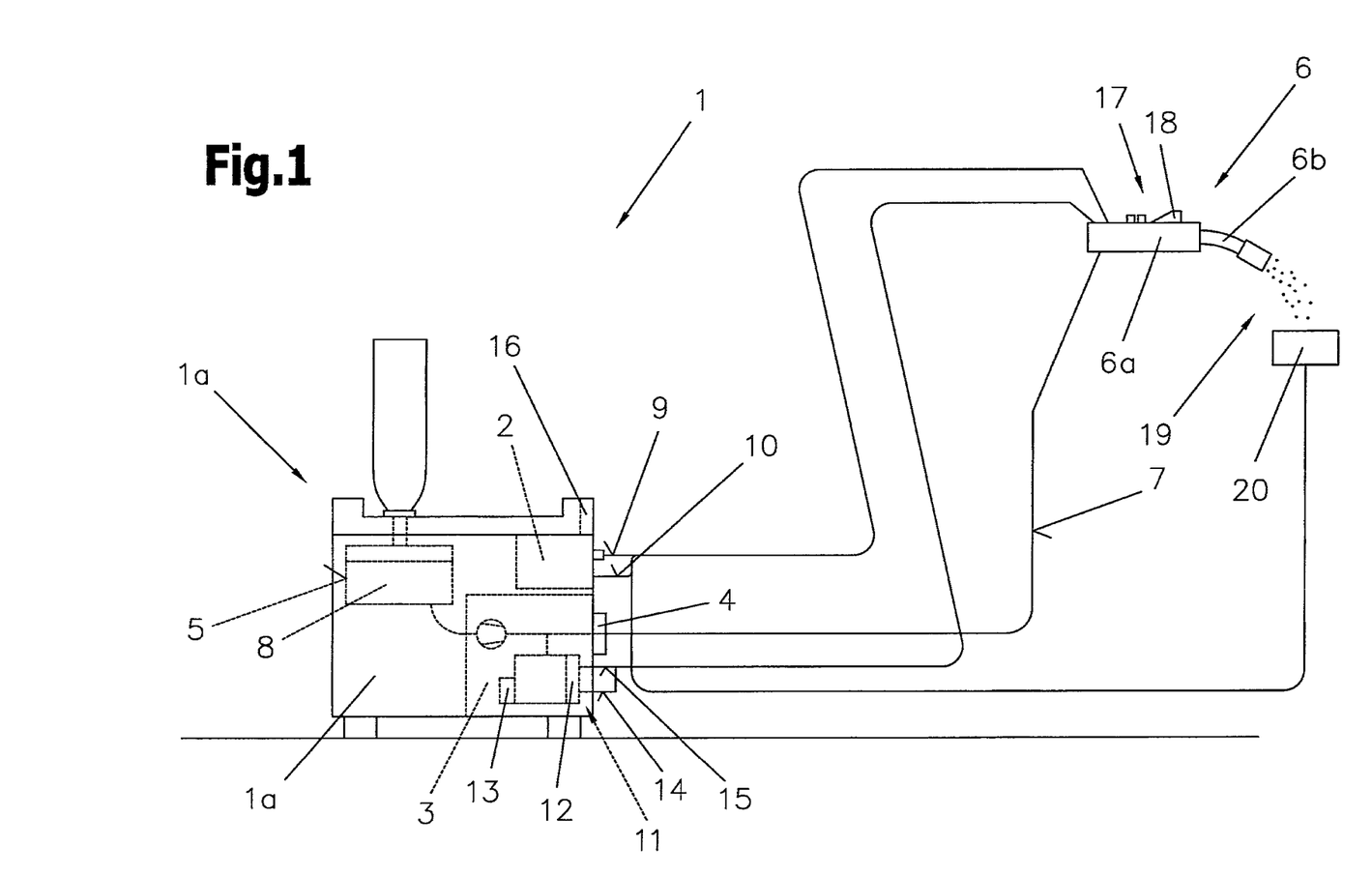
FIG. 1 shows a schematic view of a steam cutting device.

FIG. 1 shows a steam cutting device 1 for a steam cutting process. The basic device 1a of the steam cutting device 1 comprises a power source 2, a control device 3 and a locking element 4 allocated to the control device 3. The locking element 4 is connected via a supply line 7 to a container 5 and a steam plasma burner or burner 6 comprising a burner handle 6a and a burner part 6b, so that the burner 6 can be supplied with a liquid 8 provided in the container 5. The burner 6 is supplied with electrical energy from the power source 2 via the lines 9, 10.

For cooling the burner 6, the latter is connected to a liquid container 13 of its own or to the container 5 via a cooler circuit 11, at best by inserting a flow monitor 12. Upon putting into operation the burner 6 or the main part 1a, the cooler circuit 11 can be started by the control device 3 and thus cooling of burner 6 via the cooler circuit 11 can be achieved. The steam plasma burner 6 is connected to the liquid container 13 or the container 5 via cooling lines 14, 15, to form the cooler circuit 11. The cooler circuit 11 may also be formed directly via the liquid supply of the burner 6 from the container 5 via the supply line 7, thus requiring only a single liquid supply to the burner 6.

Furthermore, the main part 1a may comprise an input and/or display device 16, via which a large variety of different parameters and/or modes of operation of the steam cutting device 1 may be adjusted and displayed. The parameters adjusted via the input and/or display device 16 are forwarded to the control device 3, which correspondingly triggers the individual components of the steam cutting device 1.

The steam plasma burner or the burner 6 can comprise at least an operating element 17, in particular a push button 18. Via the operating element 17, in particular via the push button 18, the user can inform the control device 3 from the point of the burner 6 that a steam cutting method is to be initiated or carried out. Furthermore, for example, pre-adjustments can be made on the input and/or output device 16, in particular to the effect that the material to be cut or the voltage to be used are pre-defined. Of course, other operating elements may be arranged on the burner 6, via which one or several operating parameters of the steam cutting device 1 can be adjusted from the point of the burner 6. For this purpose, these operating elements 17 can be connected to the main part 1, in particular to the control device 3 directly via lines or via a bus system. The operating element 17 can also comprise a display device, for example, an LCD display, so that corresponding adjustments, parameters or information can be displayed to the user on the burner 6.

Upon actuating the push button 18, the control device 3 activates the individual components needed for the steam cutting method. For example, first of all, the pump (not shown), the locking element 4 as well as the power source 2 are triggered, whereby supplying the burner 6 with the liquid 8 as well as with electrical energy is initiated. Then, the control device 3 activates the cooler circuit 11, so that cooling the burner 6 becomes possible. Due to supplying the burner 6 with liquid 8 and energy, in particular with current and voltage, the liquid 8 is converted into a gas 19 in the burner 6, in particular into plasma of a high temperature, so that a cutting process can be carried out on a work piece 20 with the gas 19 or plasma escaping from the burner 6.

Figure 2:
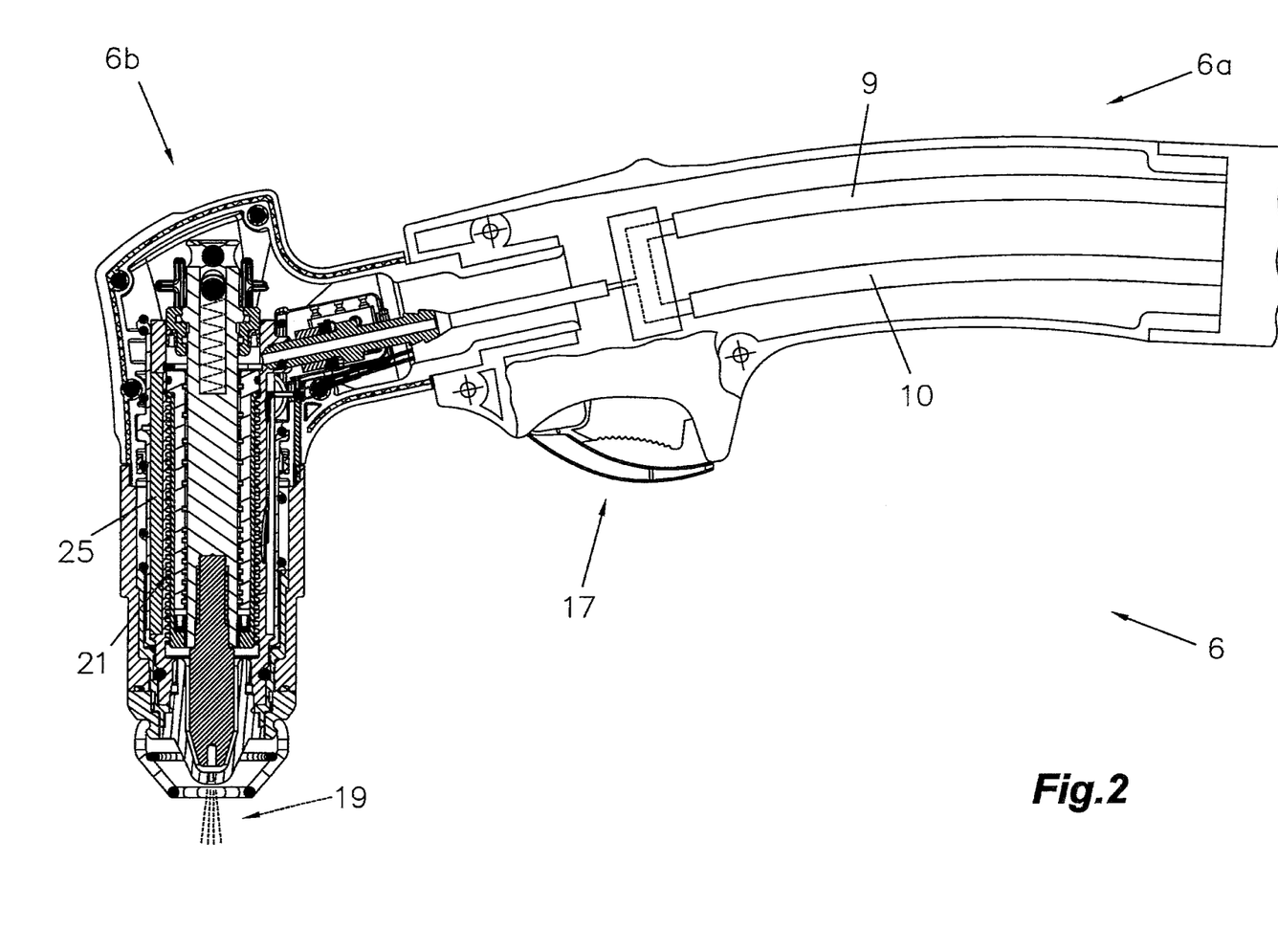
FIG. 2 shows a schematic view of the construction of a burner from the prior art having a resistance heating element.

FIG. 2 shows a known steam plasma burner or burner 6, such as is described e. g. in AT 502 448 B1. In such a burner 6, a common ohmic resistance heating having a heating wire is employed, which is not arranged completely around a vaporiser 21 of the burner 6, however. The construction of the burner 6 is not explained in further detail here, since it is known from AT 502 448 B1.

Figure 3:
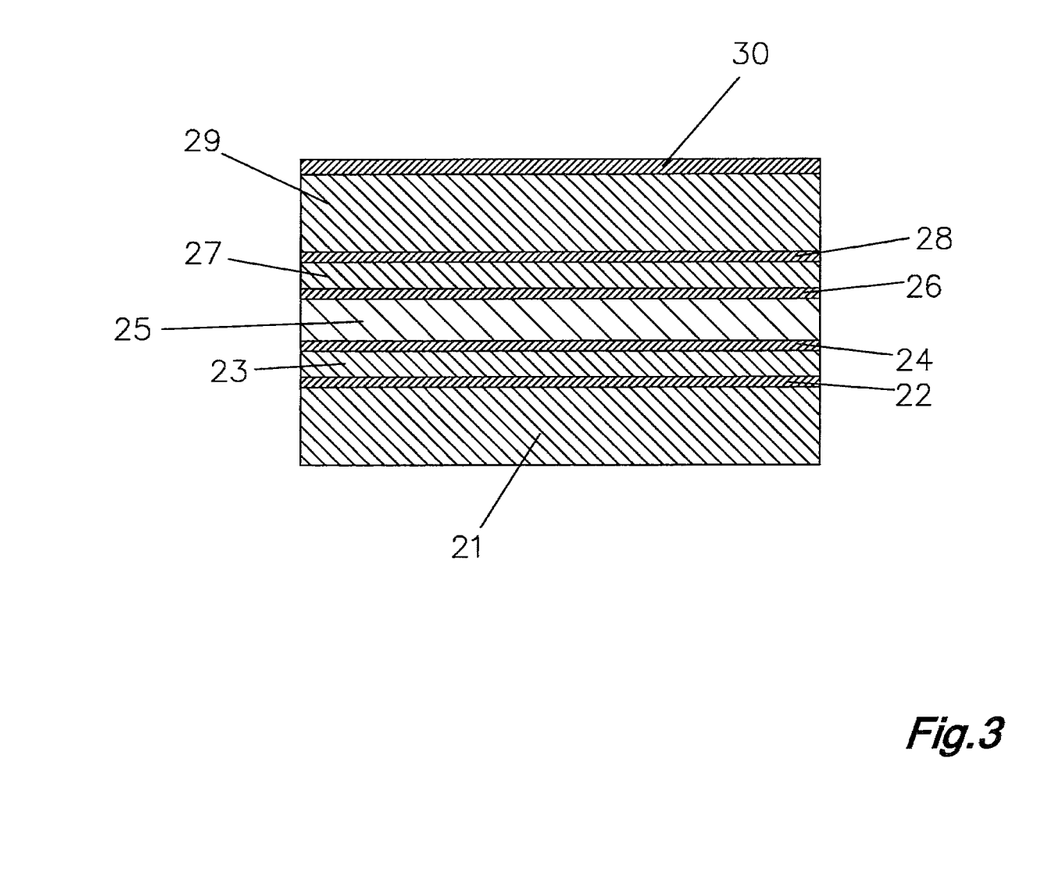
FIG. 3 shows a schematic view of thermal construction of the burner according to FIG. 2.

FIG. 3 shows a schematic thermal construction in the use of an ohmic heating element 25, as is shown in the burner 6 according to FIG. 2. An insulating layer 23 adjoins a vaporiser 21 of the burner 6 by forming a transition resistance 22, which insulating layer is adjoined by the heating element 25, in particular the resistance element, by forming another transition resistance 24. A transition resistance 26 is formed between the heating element 25 and an insulating layer 27, whereby another, outer insulating layer 29 having a fixing 30 is arranged by means of forming another transition resistance 28. Thus, the heating element 25, in particular the resistance heating known from the prior art, is composed of the elements 22 to 30. This thermal construction corresponds to the portion of the heating device and the channel according to AT 502 448 B1.

In the burner 6 which comprises the ohmic heating element 25 and is known from prior art, the heat transfer takes place as follows. The energy is converted in the heating element 25, in particular in the heating wire, and is transferred to the insulating material 23 via a heat transition resistance $R_{th1}$ of the transition resistance 24. The insulating material 23 has a thermal resistance $R_{th2}$ corresponding to the heat conduction. From the insulating material 23, the energy is transferred to the vaporiser 21 via a further heat transition resistance $R_{th3}$ of the transition resistance 22, which is independent of the surface quality and type of assembly.

Therefore, it follows that $$R_{th_{entire}} = R_{th1} + R_{th2} + R_{th3} \text{ [K/W]}$$

The larger $R_{th_{entire}}$, the larger the temperature difference between the heating element 25 and the vaporiser 21.

The transition resistances 22, 24 result in very large temperature differences between the actual heating wire or the ohmic heating element 25 and the vaporiser 21. This may also result in errors regarding the measurement of temperature, since the thermal sensor is situated between the vaporiser 21 and the heating element 25, in particular between the vaporiser 21 and the transition resistance 22. In addition, the entire system becomes very slow, since the vaporiser 21 warms up in a delayed manner, after electrical energy in the heating wire or the heating element 25 has been converted into heat.

Figure 4:
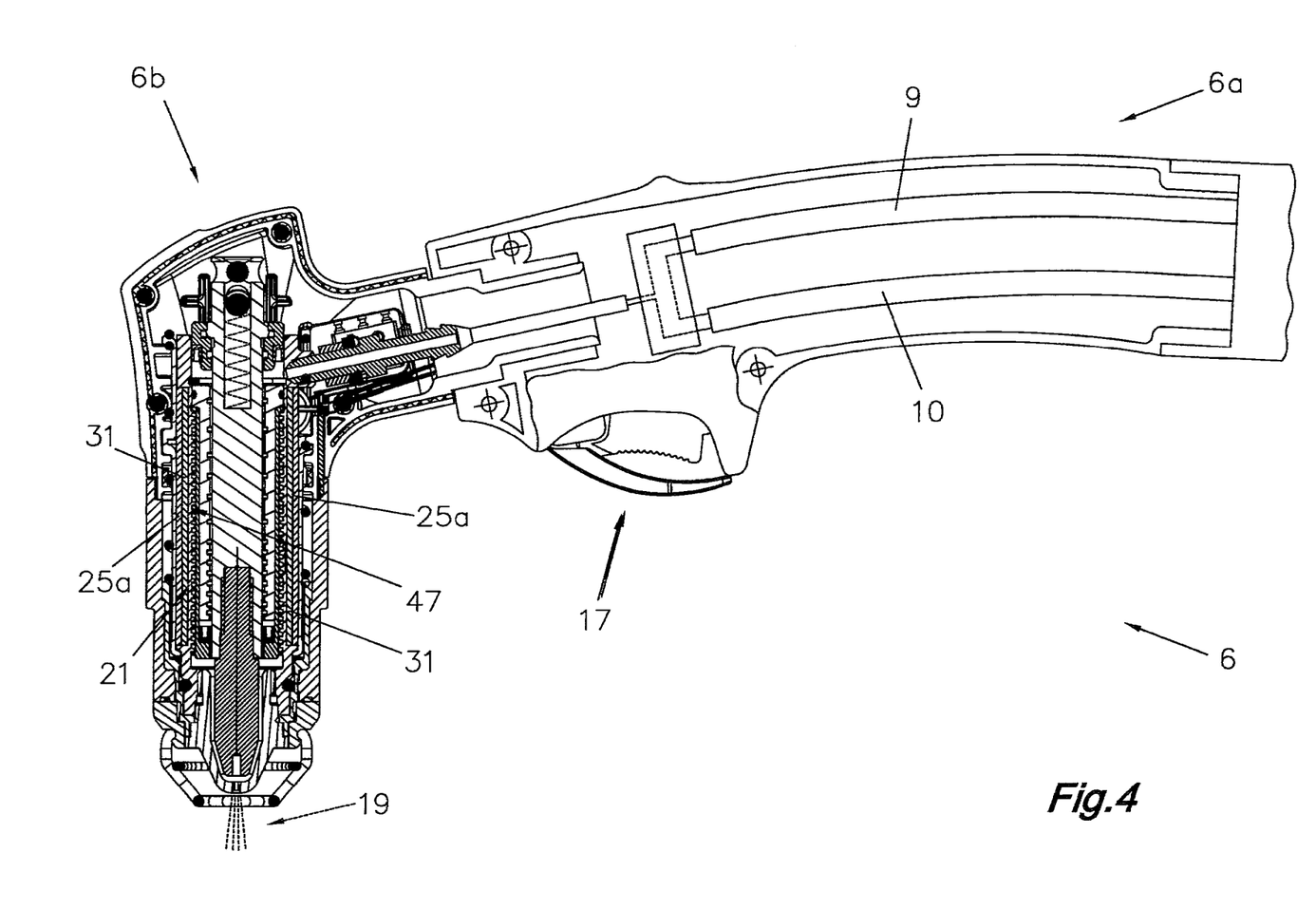
FIG. 4 shows a schematic view of the construction of a novel burner having an induction heater.
Figure 5:
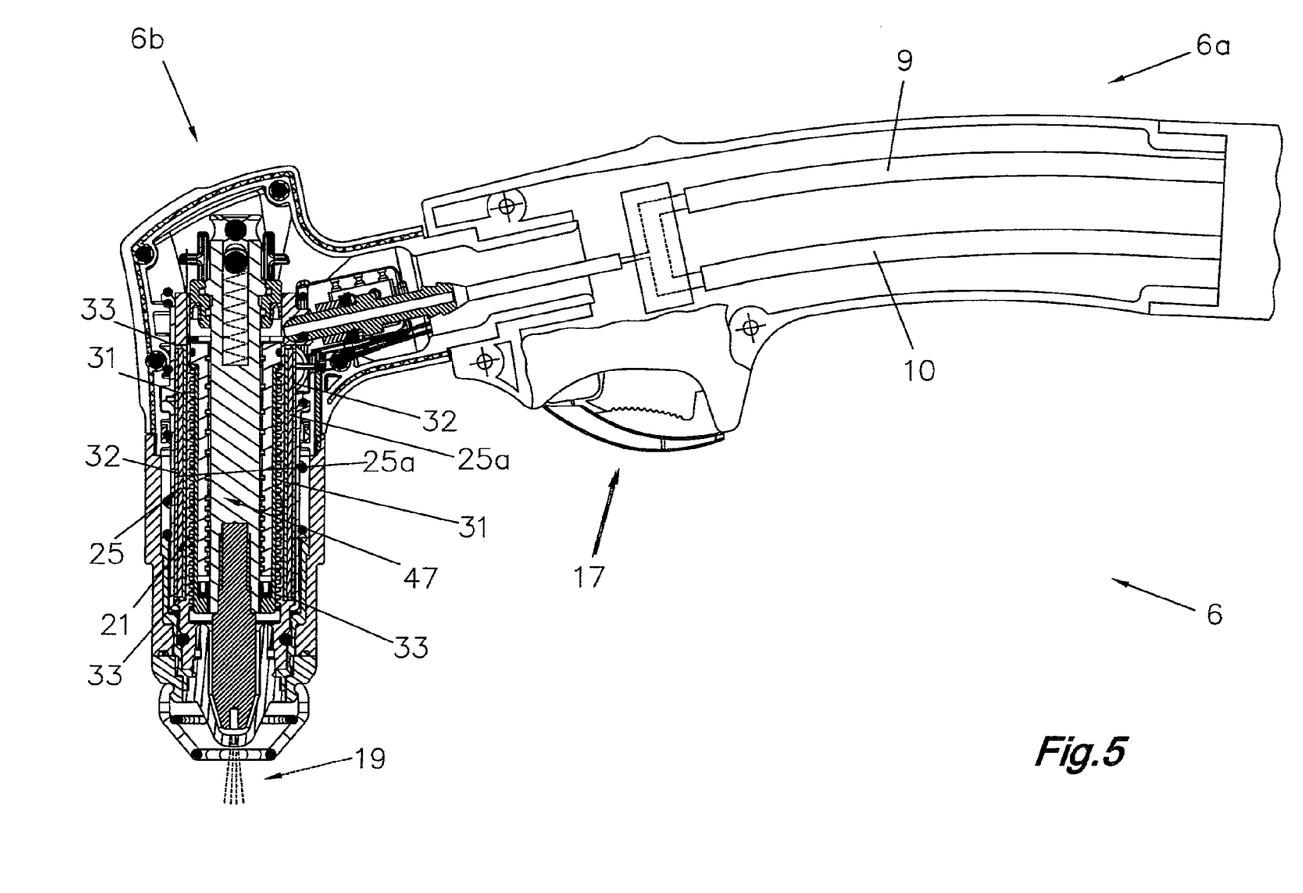
FIG. 5 shows a schematic view of an improved thermal construction of the burner having an induction heater.
Figure 6:
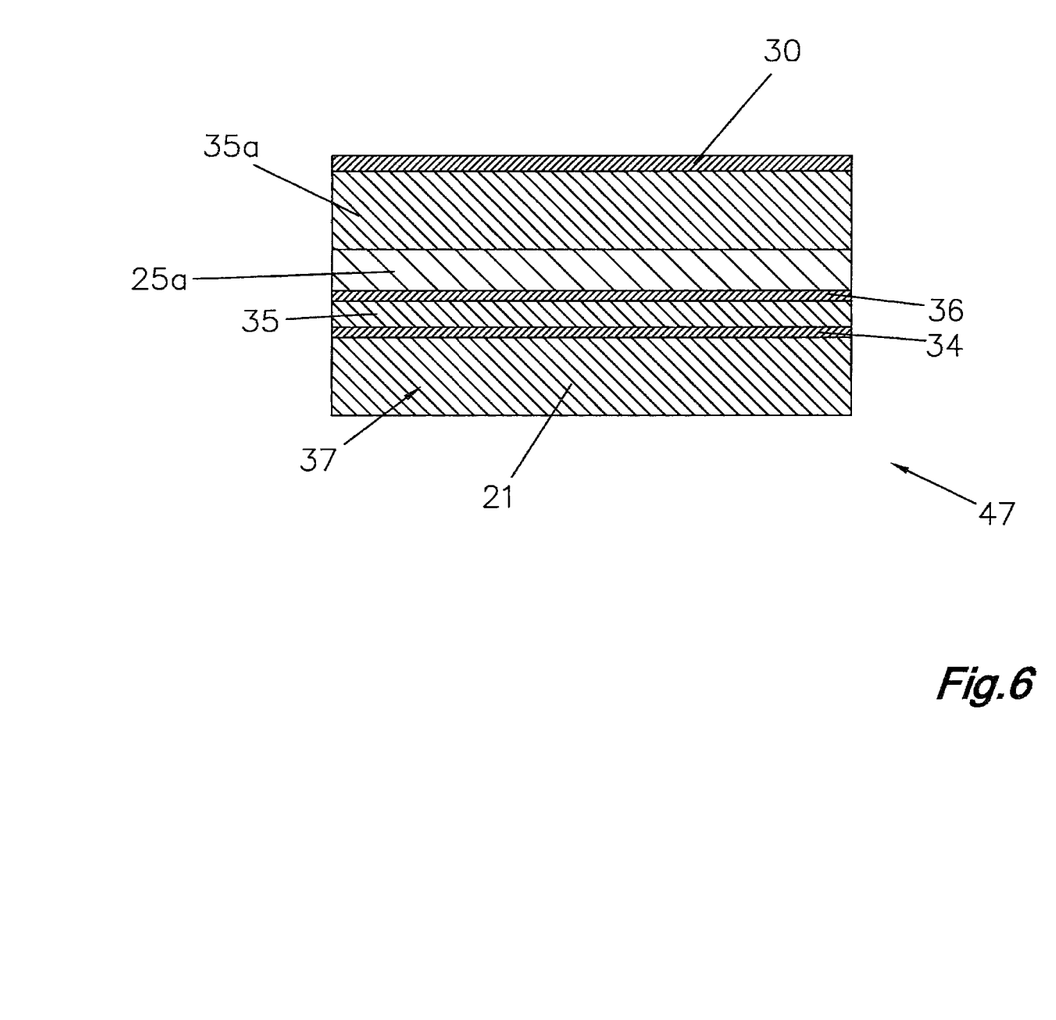
FIG. 6 shows a schematic view of the thermal construction of the burner according to FIG. 5.

In the burner 6 according to FIGS. 4 to 6, according to the invention, it is provided to improve the heat input and the slowness of the known system according to the FIGS. 2 and 3 and to obtain an improved vaporisation.

For improvement of the heat input, the construction was modified to the extent that now an inductive heating element, i.e. an induction heater 47, which in particular is realized by a coil 25a (schematically indicated), is used instead of the heating by means of an ohmic resistance wire according to FIGS. 2 and 3. For retrofitting it is necessary to use corresponding materials in order to obtain a corresponding thermal output. Materials having a good thermal conductivity, such as copper, aluminium or silver, from which the vaporisers 21, 40 are usually composed of, however, require a very high frequency, due to the good electric conductivity and the low magnetic permeability, to guarantee a low penetration depth of the eddy current and thus a high electric resistance. In addition, a large amount of reactive power is to be applied to convert the real power in the material. This entails a very complex and cost-intensive circuit construction. If, however, ferromagnetic materials are used, the heat conduction will be worse by factors.

According to the invention it is provided that a main part 31 made of a ferromagnetic, electrically conductive material is applied onto the vaporiser 21 consisting of a material having a good thermal conductivity, such as copper, silver, aluminium, aluminium nitride, etc. The heating element 25 is composed of an induction heater 47, which is integrated in the burner 6 in such a manner that the former is arranged on a hybrid construction of the vaporiser 21 made of a thermally highly-conductive material having an easily magnetisable material 35, in which a coil 25a is embedded. Thus, the frequency for triggering the induction heater 47 and the reactive power to be applied can be reduced significantly, thus enabling an economical use. The heat transition resistance between the two materials can be kept very small by means of press-mounting, electroplating, micro forging, shrink-mounting, thermal coating, etc.

Triggering the power source 2 (not shown), in particular the power part for the induction heater 47 is carried out in the so-called "current mode", as is known from the prior art, with a full bridge working in a frequency-variable manner. In the case of fixed frequencies, the transferred power changes in dependence on the temperature, because the electrical conductance and thus the penetration depth are changing. In the current mode, the current increases approximately linearly until it reaches a set threshold value; then, one side of the half bridge is switched off. As the leakage inductance of the heater is to be discharged first, the current continues to flow into the same direction for a while. At this moment, however, the current is re-fed through the coil and into the intermediate circuit. The polarity on the coil changes, and now the other side of the half bridge can be switched on in a zero-potential and zero-loss manner.

FIG. 5 shows another embodiment of a burner 6 including an improvement of the heat input and a reduction of the reactive power. Thus, a very good power factor of reactive power to apparent power and a further reduction of the frequency are achieved by further optimising the magnetic circuit. For this purpose, the hybrid construction of the vaporiser 21 is extended in such a manner that the coil 25a of the induction heater 47 is embedded in a main part 31 and a covering element 32 made of ferromagnetic highly-permeable materials. In this connection, attention has to be paid to the fact that the upper ferromagnetic highly-permeable material, i.e. that side facing away from the vaporiser 21, be designed in an insulating manner in eddy current flow direction, since otherwise here, too, large eddy current losses will occur. Upon choosing the material attention is to be paid to the fact that the iron losses are low. In particular, soft-magnetic materials, such as ferrites, amorphous or nanocrystalline materials are suited for this. The latter are particularly suited due to their high Curie temperature.

To achieve further improvement, the magnetic circuit was closed by extending the construction by laterally arranged webs 33. For a simple, inexpensive construction to be possible, the highly permeable covering element 32 facing away from the vaporiser 21 was not enclosed in the webs 33, but superimposed on the webs 33, for which purpose a step-like design of the webs 33 was designed. Thus, the hybrid construction of the induction heater 47 is composed of a main part 31 with laterally extending webs 33, inside of which the coil 25a is arranged, and finally a covering element 32.

FIG. 6 now shows the thermal construction having an induction heater 47 as compared to a resistance heater of the prior art according to FIG. 3.

Therein are shown a vaporiser 21, a heat transition resistance 34 between the vaporiser 21 and an easily magnetisable or ferromagnetic material 35, the easily magnetisable material 35, an eddy current 36 in the easily magnetisable, ferromagnetic material 35, the coil 25a, in particular an enamelled wire, a thermally highly conductive or highly permeable material 37 for optimising the magnetic circuit and a fixing 30.

The heat transfer takes place as follows:

In the easily magnetisable material 35 (iron, high-grade steel, nickel, cobalt or alloys thereof), an eddy current 36 is induced by the coil 25 by inductive coupling. Said eddy current penetrates the easily magnetisable material in dependence on the frequency and the material properties. In dependence of the penetration depth, the geometry of the current flow and thus the electric resistance are predefined, whereby heat is generated in the layer in which the induced current is flowing. This heat flows to the vaporiser 21 via the thermal resistance, in particular the easily magnetisable material 35, and via the heat transition resistance 34.

In this construction, for example, by means of inductive heating of the vaporiser 21, outputs of 500 W in the case of an area of 9.7 cm², at a temperature difference of <5K, may be transmitted. This corresponds to a heat transition coefficient of 103 kW/(m²*K). Thus, an improvement by a factor of approx. 300 as against the ohmic heating is achieved.

Due to optimising the magnetic circuit and the selection of the correct materials, the control may be simpler than in known induction heaters, which obviously results in a major cost advantage. Thus, the induction heater 47 can be operated with a conventional H-bridge of a fixed frequency. The advantage of this type of triggering is that the output can be regulated through pulse width modulation. The power part can be regulated via phase shifting by means of a parallel connection of capacitors and transistors and suitable triggering. The transistors can be switched in an almost loss-free manner. What is of disadvantage, however, is that the transferable power changes with the temperature of the ferromagnetic metal, since the electrical conductance and thus the penetration depth are changed here, too. Thus, different power transfers occur in the cold and warm states upon the same triggering scheme. In many cases, this constitutes an undesired circumstance. Remedy can be provided to a certain extent by variably selecting the frequency and operating the circuit for triggering the induction heater 47 in the current mode. In doing so, always two transistors are switched on until a certain current value has been reached by the heating. Thereupon, these transistors are switched off, and the other two transistors are switched on until the current has been reached. The advantage of this type of triggering is that, in addition to the power transfer being kept in a certain range, the half-waves are always the same length and synchronous and thus the same power is transferred in both the positive and negative half-waves. This is of particular advantage insofar as the alternating voltage is not superimposed by a direct voltage and therefore the magnetic materials do not reach saturation. Another advantage is that the desired output can be adjusted as desired by setting the current threshold value accordingly. Here, too, switching losses can be kept at a minimum by connecting capacitors in parallel to the transistors.

Figure 7:
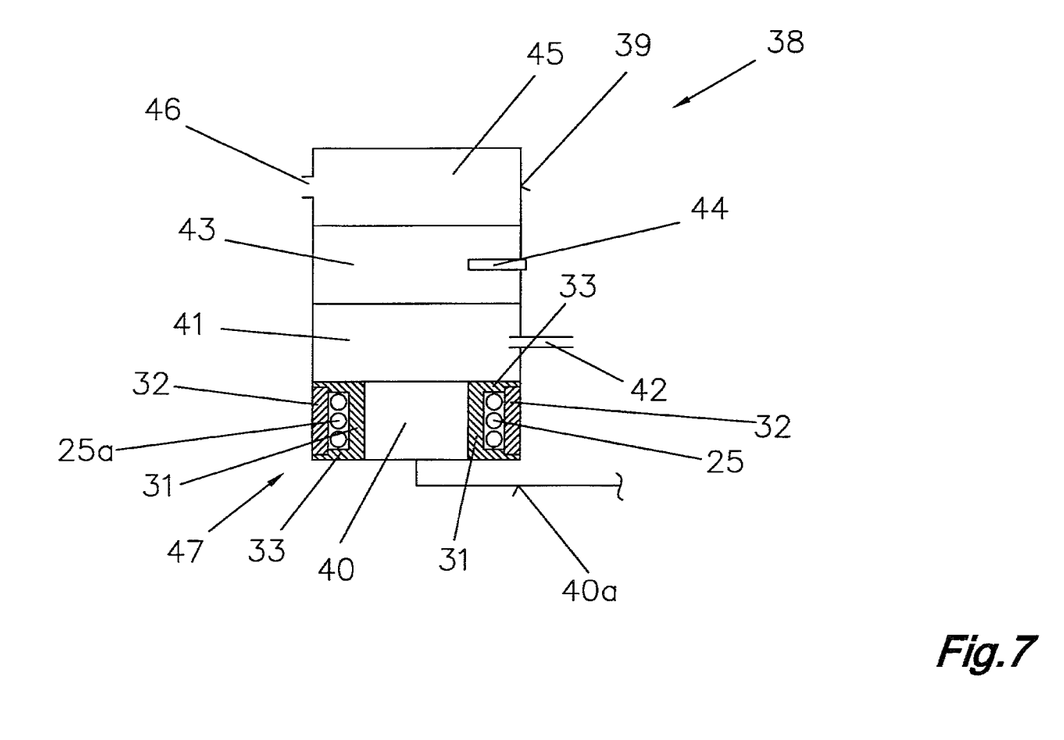
FIG. 7 shows a schematic view of a burner of a power-generating device.

For example, it is also possible to use the induction heater 47 according to the invention in a thermal generator, in particular a DC-DC generator, which is described e.g. in WO2010/078606 A2. FIG. 7 describes another embodiment, which pertains to a burner 38 of a power-generating device of a charger having a heating element 25. The burner housing 39 comprises several areas arranged one upon the other. The lowermost area is formed by a vaporiser 40 in which a filler may be arranged. The vaporiser 40 comprises a connection for a supply line 40a of a liquid system (not shown) for the fuel. On top of the vaporiser 40, there is located a mixing area 41, connected to which is an air supply tube 42, so that a fuel mixture can be formed. A nozzle can be arranged between the vaporiser 40 and the mixing area 41. Above the mixing area 41 is the combustion chamber 43 where the fuel mixture is combusted and preferably the ignition device 44 is integrated. A sieve is preferably arranged as a transition from the mixing area 41 to the combustion chamber 43. The waste gases from the burner housing get into the atmosphere or to the outside via the waste gas chamber 45 and a waste gas opening 46.

The burner housing 39 essentially consists of two bodies which, however, are preferably manufactured from one piece. Both bodies are designed cylindrically, one body being formed by the vaporiser 40 and the other body containing the areas lying above and representing the outer shape of the burner housing 38. The vaporiser 40 is connected to a heating element 25 which is preferably arranged around the vaporiser 40. Thereby, the outer shape of the heating element 25 is adapted to the outer shape of the burner housing 39. Likewise the heating element 25 and the vaporiser 40 essentially constitute a unit. The heating element 25 can also be integrated in the vaporiser 40 or in the burner housing 39. This enables an extremely compact construction of the burner 38.

According to the invention, the heating element 25 is now formed for the burner by an induction heater 47 which surrounds the vaporiser 40. The induction heating element 47 is embedded in a hybrid construction and a coil 25a is enclosed by the hybrid construction having an easily magnetisable material 35, which adjoins a thermally highly-conductive material 37 of the vaporiser 40. The construction of the induction heater 47 of the burner 38 according to FIG. 7 equals or is similar to that of the induction heater 47 of the steam cutting device 1 of FIGS. 4 to 6.

The hybrid construction of the induction heater 47 can be integrated in the housing of the burner 38 or, as shown, be composed as an independent annular component, which subsequently is put onto the burner 38, so that it encloses the vaporiser 40. By activating the induction heater 47, the burner 38, in particular the area of the vaporiser 40 is heated, so that the supplied fuel mixture will be heated and vaporises. Preferably the induction heater 47 is used in the start phase only and subsequently deactivated to use up as little energy as possible and to thus increase the efficiency of the DC-DC generator. To this end, the burner 38 is designed in such a manner that, due to the temperature balance of the burner 38, there will occur a self-vaporisation of the fuel mixture and thus, after a certain operating time, the induction heater 47 will no longer be needed. If, however, additional heating for the burner 38 is needed due to very low external temperatures, the induction heater 47 can be switched on also during operation.

The heating element 25 can therefore be used for liquids to be vaporised, e. g. for a burner 6 of a steam cutting device 1 or a burner 38 of a power-generating device and is designed as an induction heater 47 which is embedded in a hybrid construction. A coil 25a is enclosed by the hybrid construction having an easily magnetisable material 35, which is designed for adjoining a thermally highly-conductive material 37 of a vaporiser 21, 40. Preferably, the heating element 25 is designed as a self-contained unit. The hybrid construction of the induction heater 47 is composed of a main part 31 with laterally extending webs 33, inside of which the coil 25a is arranged, and on which finally a covering element 32 is arranged. Preferably, the easily magnetisable material 35 of the hybrid construction, i.e. of the main part 31, is pressed onto the thermally highly-conductive material 37 of the vaporiser 21, 40, so that a transition resistance resulting from an air gap can be avoided.

The invention claimed is:

1. A heating element (25) for liquids to be vaporized, for instance, a burner (6) of a steam cutting device (1) or a burner (38) of a power-generating device, said element being designed as an induction heater (47) having a coil (25a), wherein the coil (25a) of the induction heater (47) is enclosed in a hybrid construction which is composed of a main part (31) with laterally extending webs (33) extending laterally of the coil and comprises an easily magnetizable material (35) and a thermally highly-conductive material, a covering element (32) comprising nanocrystalline materials being arranged on said webs (33), and the easily magnetizable material (35) comprising a soft magnetizable material and being designed to adjoin a thermally highly-conductive material (37) of a vaporizer (21).

2. The heating element (25) according to claim 1, wherein the easily magnetizable material (35) is made of iron or ferritic high-grade steel.

3. The heating element (25) according to claim 1, wherein the thermally highly-conductive material (37) is made of copper, aluminum or silver.

4. The heating element (25) according to claim 1, wherein the easily magnetizable material (35) of the hybrid construction is pressed onto the thermally highly-conductive material (37) of the vaporizer (21).

5. The heating element (25) according to claim 1, wherein the easily magnetizable material (35) encloses the coil (25a) on all sides.

6. The heating element (25) according to claim 1, wherein a current mode operated circuit is provided for triggering the induction heater (47).

7. The heating element (25) according to claim 6, wherein the circuit comprises transistors, whereby always two transistors are being switched on until a certain current value has been reached by the heating.

8. A steam cutting device (1), comprising a burner (6), a control device (3), a liquid supply and a power source (2), the burner (6) being connected to the power source (2) via lines (9, 10) and to the liquid supply via a supply line (7), and in the burner (6) at least one channel being present for converting a liquid into a gas, whereby the burner (6) comprises at least one cathode and one anode, between which a vaporizer (21) is formed, and the liquid supply being connected to an intermediate space between the cathode and the anode through the channel via a line, and whereby furthermore a heating element (25) is arranged in the burner (6), which element is allocated to the channel for vaporization of the liquid, wherein the heating element (25) is formed by an induction heater (47) enclosing the vaporizer (21), which induction heater (47) is embedded in a hybrid construction composed of a main part (31) with laterally extending webs (33) extending laterally of a coil (25a) enclosed by the hybrid construction comprising an easily magnetizable material (35) comprising a soft magnetizable material which adjoins a thermally highly-conductive material (37) of the vaporizer (21), and wherein a covering element (32) comprising nanocrystalline materials is arranged on the webs (33).

9. The steam cutting device (1) according to claim 8, wherein the induction heater (47) has a coil (25a) enclosed in a hybrid construction which is composed of a main part (31) with laterally extending webs (33) and consists of an easily magnetizable material (35) and a thermally highly-conductive material, a covering element (32) consisting of nanocrystalline materials being arranged on said webs (33), and the easily magnetizable material (35) being designed to adjoin a thermally highly-conductive material (37) of a vaporizer (21).

10. A burner (38) of a power-generating device of a charger comprising a heating element (25) which is arranged in a burner housing (39), whereby a connection to a vaporizer (40) of the burner (38) is provided, and the outer shape of the heating element (25) is adapted to the outer shape of the burner housing (39), whereby the vaporizer (40) is connected to a liquid supply for the supply of fuel, wherein the heating element (25) is formed by an induction heater (47) having a coil body provided with windings, the core of which coil body being formed by the vaporizer (40), and enclosing the vaporizer (40), and wherein the induction heating element (47) is embedded in a hybrid construction composed of a main part (31) with laterally extending webs (33) extending laterally of a coil (25a) enclosed by the hybrid construction having an easily magnetizable material (35) comprising a soft magnetizable material adjoining a thermally highly-conductive material (37) of the vaporizer (40), and wherein a covering element (32) comprising nanocrystalline materials is arranged on the webs (33).

11. The burner (38) according to claim 10, wherein the induction heater (47) has a coil (25a) enclosed in a hybrid construction which is composed of a main part (31) with laterally extending webs (33) and consists of an easily magnetizable material (35) and a thermally highly-conductive material, a covering element (32) consisting of nanocrystalline materials being arranged on said webs (33), and the easily magnetizable material (35) being designed to adjoin a thermally highly-conductive material (37) of a vaporizer (21).

* * * * *